(12) United States Patent
Phelps

(10) Patent No.: US 6,392,992 B1
(45) Date of Patent: May 21, 2002

(54) SIGNAL DEGRADE OSCILLATION CONTROL MECHANISM

(75) Inventor: Peter William Phelps, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/200,782

(22) Filed: Nov. 30, 1998

(51) Int. Cl.[7] .................................................. H04J 1/16
(52) U.S. Cl. ..................................................... 370/225
(58) Field of Search ................................. 370/225, 445, 370/228, 216, 217, 219, 220, 461, 462, 226, 227, 241, 229, 403, 404, 405, 406; 340/827, 825.01, 825.03; 379/221; 359/118, 119, 117, 135, 139

(56) References Cited

U.S. PATENT DOCUMENTS 5,163,041 A * 11/1992 Moriyama .................. 370/228
5,193,086 A * 3/1993 Satomi et al. ............... 370/228
5,200,949 A * 4/1993 Kobayashi .................. 370/228

OTHER PUBLICATIONS

Sonet Transport Systems: Common Criteria Network Element Architectural Features, GR–253–CORE, Issue 2, Dec. 1995, pp. 5–24, 5–25 and 5–27.

* cited by examiner

*Primary Examiner*—Dang Ton
(74) *Attorney, Agent, or Firm*—Smart & Biggar

(57) ABSTRACT

A line condition control (LCC) algorithm is disclosed that is implemented within a switching card that chooses, for information transmission, between working and protection fiber optic channels. The disclosed LCC algorithm ensures that a channel with an oscillating signal failure condition will be utilized instead of a channel with a solid signal failure condition. The LCC algorithm, input with an input line condition (ILC) corresponding to one of the fiber optic channels, outputs a corresponding output line condition (OLC) that is input to a decision algorithm within the switching card. The OLC is set to a signal degrade condition if either a protection oscillation control (POC) mechanism is activated or if a specified number of signal failure condition clearances are detected within a set time period which, in turn, activates the POC mechanism. Otherwise, the OLC is set equal to the ILC. A channel with a signal degrade condition will always be chosen by the decision algorithm over a channel with a signal failure condition and therefore, a channel with an oscillating signal failure condition that has its OLC set to a signal degrade condition will be chosen over another channel that has a solid signal failure condition.

27 Claims, 4 Drawing Sheets

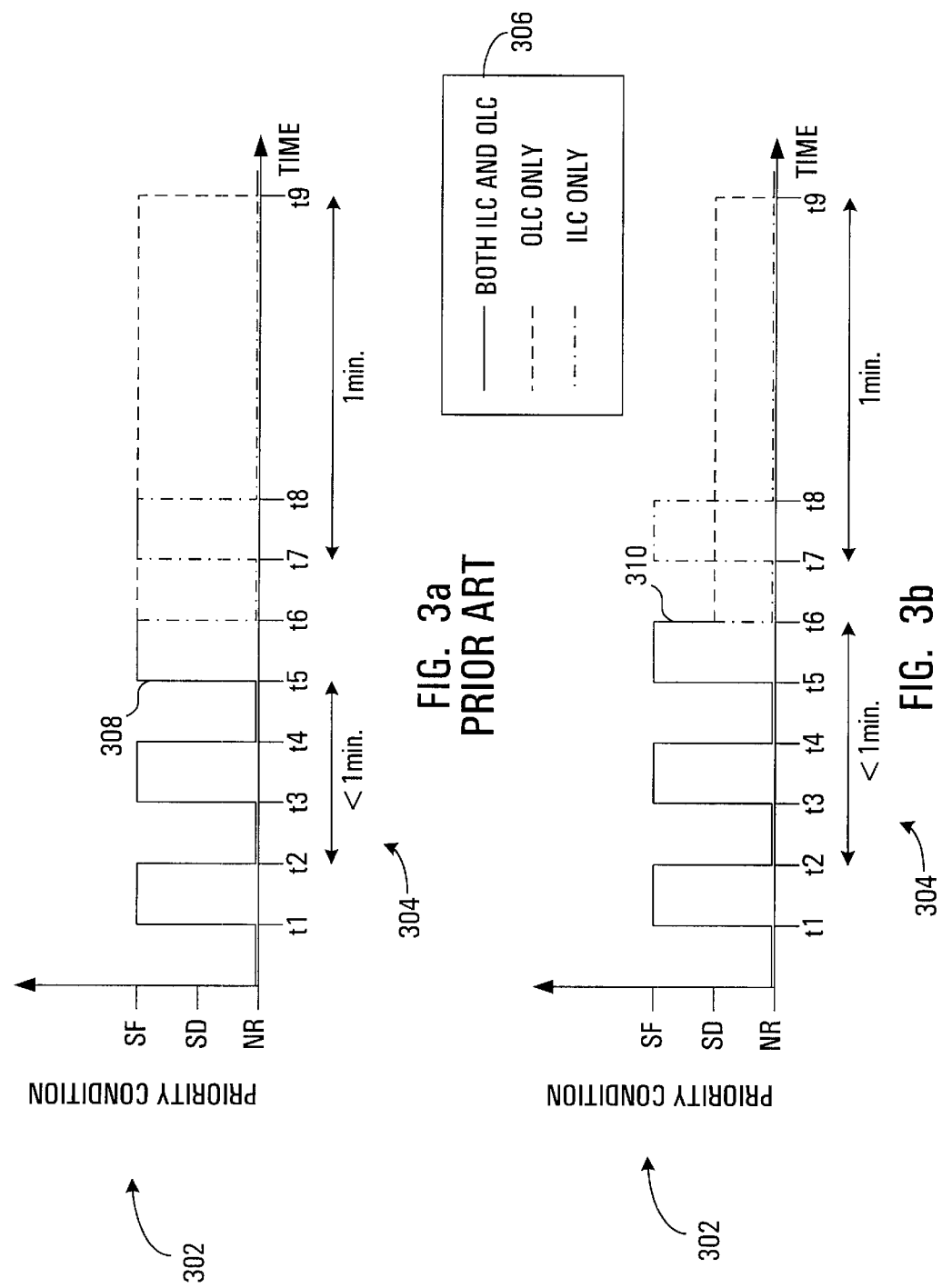

SIGNAL DEGRADE OSCILLATION CONTROL MECHANISM

FIELD OF THE INVENTION

This invention relates generally to protection mechanisms and more specifically to failure protection within a communication system.

BACKGROUND OF THE INVENTION

Communication systems have become of critical importance within today's society. With this increase in importance comes a need for communication infrastructures to maintain a higher reliability and signal quality. To create these higher standards many techniques have been implemented. One extremely successful and wide spread method to maintain the integrity of communication networks, even during problem time periods, is through the use of redundant communication channels.

The use of redundant channels allows communication links traversing a primary channel to be transferred to an alternative channel when problems occur with respect to the primary channel. Utilizing this technique are fibre optic communication links, each typically comprising a working channel and a protection channel that are physically identical in bandwidth and functionality. In normal operations, with no faults indicated on either channel, the communication path is chosen to be through the working channel. In cases that a problem is indicated concerning the working channel with no problem indicated on the protection channel, the particular communication link is redirected via the protection channel without interrupting the actual transmission of information.

Within the fibre optic communication system, a decision procedure is performed to determine which of the physical channels, those being the working and protection channels, the transmission of information signals is to traverse. In order to decide which channel to utilize, the decision procedure is input with statuses corresponding to the individual channels. These statuses indicate the priority of any problem that might be associated with the transmission on the particular channels. The decision procedure selects for transmission the channel with the lower priority failure level in circumstances in which the working and protection channels have problems of different priorities.

Failures include, but are not limited by, solid signal failures and high bit error rates. An area of difficulty with the decision procedure exists in cases where two error types have the same priority. In such cases, the decision is made not on which error causes the least disturbance in the communication link, but on predetermined decision criteria. These decision criteria may include selecting the working channel over the protection channel in cases of equal priority failures or selecting the transmission channel that declared the most recent failure.

Unfortunately, there are circumstances that exist where signal failures that have the same priority due to a standard convention should in fact be defined with separate priorities. One case of this exists with respect to oscillating failures versus solid signal failures. An oscillating failure typically occurs on a fibre optic channel due to an equipment failure while a solid signal failure typically occurs due to a fibre and/or equipment failure. An oscillating failure can be seen as an intermittent solid signal failure. When an oscillating failure is in the failure state of the cycle it is recognized by the decision procedure as a high priority failure similar to that for a solid signal failure. Due to the consistently changing state of the problem within a fibre optic channel suffering from an oscillating failure, it is well understood for a decision procedure to lock an oscillating failure as a high priority failure if a predetermined number of cycles are detected within a predetermined amount of time.

The problem, in this case, exists if one channel is locked into a high priority failure state due to an oscillating failure and the other channel has a solid signal failure. Communication on the channel with the oscillating failure would be preferred over the channel with the solid signal failure for it would at least function properly for intermittent periods of time. Unfortunately, according to one prior art decision procedure in which the last channel to declare a high priority failure state is preferred, the communication link would continue to traverse the channel with the solid signal failure if the last channel to go to a high priority error state was the channel with the solid signal failure. According to another prior art decision procedure in which the working channel is always preferred over the protection channel when both channels are in a high priority failure state, the communication link would continue to traverse a working channel with a solid signal failure if the protection channel is locked into a high priority state due to an oscillating failure.

Therefore, a method for making channel selection decisions is needed that is flexible while compensating for different problems on the communication channels. This procedure must adhere to the standards established for the failure protection in the particular communication medium, but allow for, in particular, a solid signal failure to take priority over an oscillating failure.

SUMMARY OF THE INVENTION

It is an object of the present invention to overcome the disadvantages of the prior art and, in particular, to provide a system and method by which different failures are treated with different priorities.

According to a first aspect, the present invention provides a control apparatus capable of being implemented within a switching card coupled to at least two signal transmission means, the control apparatus being input with input line conditions (ILCs) with respect to one of the two signal transmission means and outputting corresponding output line conditions (OLCs) with use of line condition control (LCC) logic operating within the control apparatus; and wherein the LCC logic is capable of setting the OLCs equal to a first failure priority condition that is less than a maximum failure priority condition if a protection oscillation control (POC) mechanism is activated, activating the POC mechanism for a hold time if an oscillation criterion is met, and setting the OLCs equal to the corresponding ILCs if the POC mechanism is not activated.

According to a second aspect, the present invention provides a switching card incorporating the control apparatus of the first aspect, the switching card, capable of being coupled to at least two signal transmission means, further comprising a decision apparatus that takes as inputs the OLCs output from the control apparatus and selects which of the transmission means to be used for transmitting information signals with use of decision logic operating within the decision apparatus.

According to a third aspect, the present invention provides a switching card incorporating first and second control apparatuses according to the control apparatus of the first aspect, the switching card, capable of being coupled to working and protection signal transmission means, further comprising a decision apparatus that takes as input first and second OLCs output from the first and second control apparatuses respectively, the first and second control apparatuses taking as input first and second ILCs corresponding to the working and protection signal transmission means respectively; and wherein the decision apparatus selects which of the working and protection signal transmission means to be used for transmitting information signals with use of decision logic operating within the decision apparatus.

According to a fifth aspect, the present invention provides a bi-directional line switch ring (BLSR) system incorporating a plurality of communication systems according to the third aspect in which the communication systems are connected in series with a first communication system coupled directly to a last communication system.

According to a fourth aspect, the present invention provides a communication system incorporating first and second switching cards according to the third aspect, the communication system further comprising first and second port cards coupled to the first and second switching cards respectively, and first and second signal transmission means coupled independently between the first and second switching cards.

According to a sixth aspect, the present invention provides in a control apparatus capable of being implemented within a switching card coupled to at least two signal transmission means, a method of controlling output line conditions (OLCs) with use of corresponding input line conditions (ILCs), the method comprising the steps of: setting the OLCs to a first failure priority condition that is less than a maximum failure priority condition if a protection oscillation control (POC) mechanism is activated; activating the POC mechanism for a hold time if an oscillation criterion is met; and setting the OLCs equal to the corresponding ILCs if the POC mechanism is not activated.

BRIEF DESCRIPTION OF THE DRAWINGS

The preferred embodiment of the present invention is described with reference to the following figures, in which:

FIGS. 3a and 3b are plots illustrating sample operations of the fibre optic system of FIG. 1 with the LCC software depicted within FIG. 2a and with the LCC software depicted within FIG. 2b respectively.

DETAILED DESCRIPTION OF THE PREFERRED EMBODIMENT

The preferred embodiment of the present invention is now described with reference to the Bellcore standards GR-253-CORE Issue 2, hereinafter called the GR-253-CORE standards, published December 1995 entitled "SONET Transport Systems: Common Criteria Network Element Architectural Features" with pages 5–24, 5–25, and 5–27 incorporated herein by reference. Although the preferred embodiment is described with reference to fibre optic communications and, in particular, the GR-253-CORE standards, it is noted that the present invention can be modified for any similar communication system operating within fixed protocol priority limitations (for example any Synchronous Digital Hierarchy (SDH) systems) in which a redundant protection channel is utilized that may have different types of errors with similar priorities.

The GR-253-CORE standards establish three general types of conditions that a fibre optics channel can be within that are of concern within the preferred embodiment of the present invention. These conditions, as shown in Table 5-3 of the GR-253-CORE standards are Signal Fail (SF), Signal Degrade (SD), and No Request (NR). The SF, SD, and NR conditions are differentiated by the bit error rate (BER) in the particular fibre optic channel. If the BER is above a predetermined SF threshold level, indicating that virtually no signals are successfully traversing the channel, the channel is flagged with an SF condition. If the BER is below the SF threshold level but above a predetermined SD threshold level, indicating that there is degradation on the channel but communications are still possible, the channel is flagged with an SD condition. An NR condition is flagged on the channel if the BER is below the SD threshold level, hence indicating no significant problems on the channel.

Figure 1:
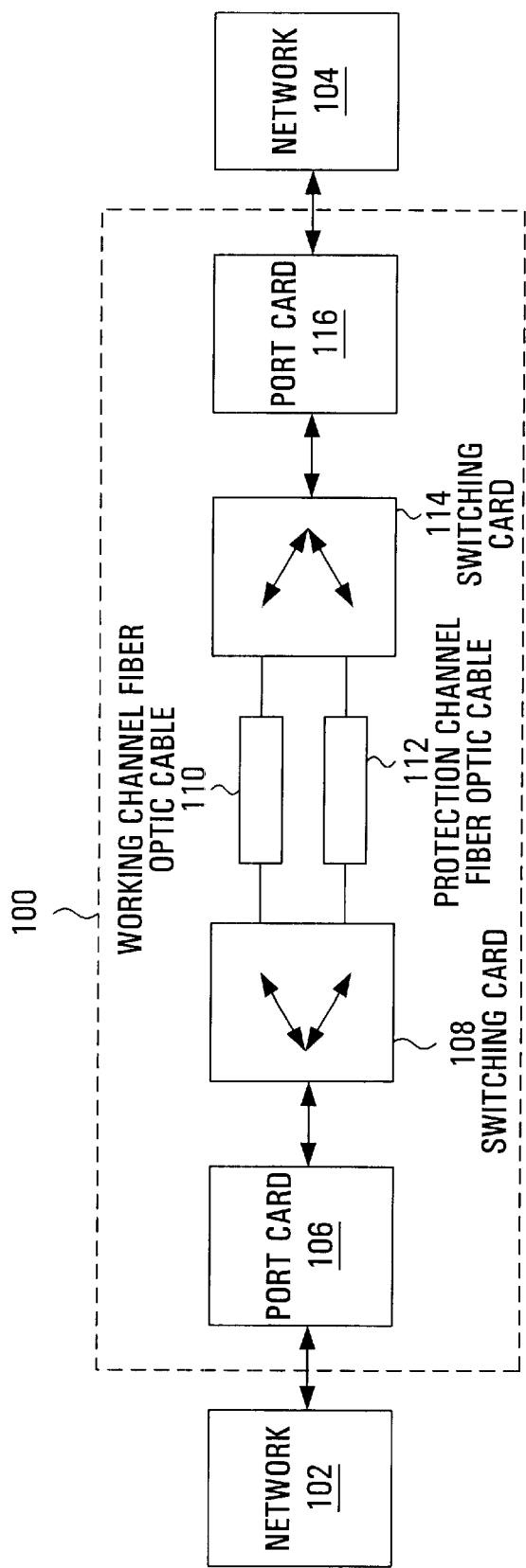
FIG. 1 is a block diagram illustrating a fibre optic communication system according to the preferred embodiment of the present invention.

A block diagram illustrating a fibre optic communication system 100 according to the preferred embodiment of the present invention is now described with reference to FIG. 1. In this setup, a first network 102 communicates with a second network 104 via the fibre optic communication system 100. The communication system 100 comprises, a first port card 106 that is coupled to the first network 102 and is further coupled in series with a first switching card 108, a working channel fibre optic cable 110 in parallel with a protection channel fibre optic cable 112, a second switching card 114, and a second port card 116 that is further coupled to the second network 104. The first and second port cards 106, 116 function as interfaces between the first and second networks 102,104 and the first and second switching cards 108,114 respectively. A Line Condition Control (LCC) algorithm according to the preferred embodiment of the present invention, described in detail herein below, is operated and contained within the functionality of the first and second switching cards 108,114. This LCC algorithm is utilized during the selection of the channel for transmission of information signals between the first and second networks 102,104.

The working channel and protection channel fibre optic cables 110,112 are OC-192 within the preferred embodiment, but one skilled in the art would understand that the fibre optic cables 110,112 could be replaced with alternative fibre optic cable, such as OC-48 or OC-12, or, in fact, alternative signal transmission means. An example of alternative signal transmission means is electrical wires or radio waves utilized in place of the fibre optic cables 110,112.

The LCC algorithm of the preferred embodiment of the present invention is input with Input Line Conditions (ILCs) for each of the working and protection channel cables 110,112 and outputs Output Line Conditions (OLCs) corresponding to each of the channel cables 110,112. Each ILC is the actual line condition corresponding to the particular channel that is detected by the switching cards 108,114 using the BER threshold levels described herein above, those conditions being the SF, SD, and NR conditions. Each OLC is the line condition determined by the LCC algorithm while operating on a corresponding ILC. The OLCs, each corresponding to a particular channel cable 110,112, are input to a decision algorithm also located within the switching cards 108,114. The decision algorithm determines which of the working and protection channel cables 110,112 is to be utilized for transmission of information signals.

The decision algorithm, according to the preferred embodiment of the present invention, may be one of a number of well-known conventional prior art decision algorithms. In one decision algorithm that can be utilized with the preferred embodiment LCC algorithm, the working channel cable 110 is chosen for transmission if both the working and protection channels have the same SF or NR condition, if the working channel has a lower priority condition than the protection channel, or if the working channel was being utilized prior to both channels having an SD condition. Conversely, the protection channel cable 112 is chosen for transmission if the protection channel has a lower priority condition than the working channel or if the protection channel was being utilized prior to both channels having an SD condition.

The preferred embodiment LCC algorithm is used to control the OLC of a particular channel during periods in which the ILC for the particular channel is cyclically changing between an SF condition and an SD or NR condition, hereinafter referred to as an oscillation condition for the ILC. An example of such a case, utilizing a prior art LCC algorithm and a LCC algorithm according to the preferred embodiment of the present invention, will be described herein below in detail with reference to FIGS. 3a and 3b respectively. The key to both algorithms is the activation of a Protection Oscillation Control (POC) mechanism if an oscillation condition is detected on an ILC. The detection of such an oscillation condition on an ILC with use of the prior art and preferred embodiment algorithms will be described in more detail herein below with reference to FIGS. 2a and 2b respectively.

The POC mechanism when activated forces the OLC, corresponding to the ILC with the oscillation condition, to be set to a predetermined failure condition rather than being equal to the ILC as is normally the case. The advantage gained by this is the resulting reduction in unnecessary switching between channels. For example, if the decision algorithm always selects the working channel for transmission over the protection channel when the failure conditions of the two channels are equal, a working channel that has an ILC cyclically switching between an SF condition and an NR condition, while the corresponding protection channel has an NR condition, will be cyclically chosen for transmission by the decision algorithm when it is in an NR condition, despite the protection channel always being satisfactory.

The prior art LCC algorithm solves this problem by activating a POC mechanism that forces the OLC to be set to an SF condition for at least a predetermined hold time $t_h$ without considering what the corresponding ILC is. The preferred embodiment LCC algorithm, on the other hand, activates a POC mechanism that forces the same OLC to be set to an SD condition for a predetermined hold time $t_h$ without regard to the corresponding ILC. This difference between the two algorithms, although appearing minor, adjusts the selection of channels in a number of important situations as will be described herein below in more detail. The POC mechanisms for the prior art and preferred embodiment LCC algorithms are hereinafter referred to as an SF POC mechanism and an SD POC mechanism respectively in order to recognize their differences in implementations.

Figure 2A:
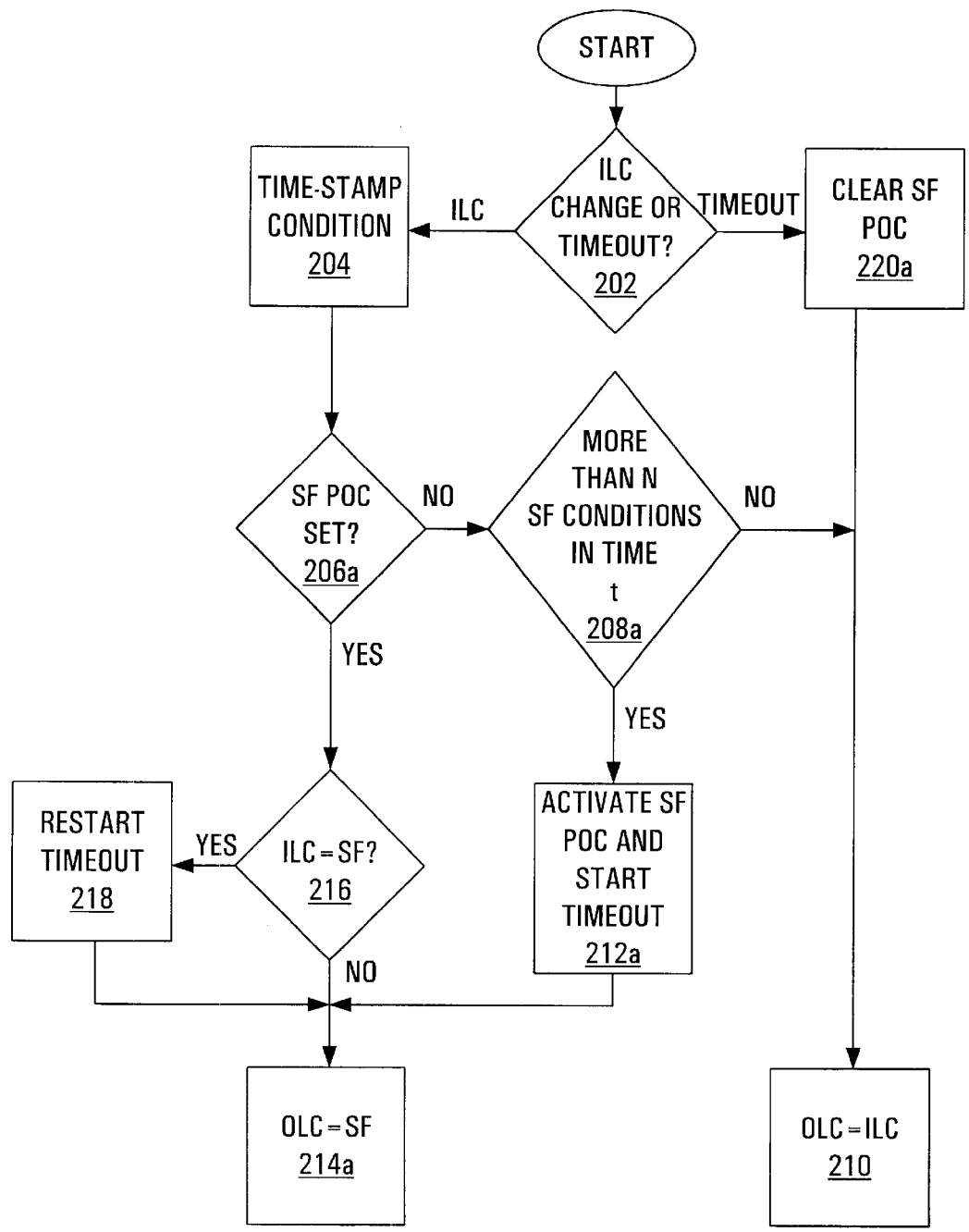
FIGS. 2a and 2b are flow charts illustrating the steps performed during a prior art Line Condition Control (LCC) software and the steps performed during a preferred embodiment LCC software respectively.
Figure 2B:
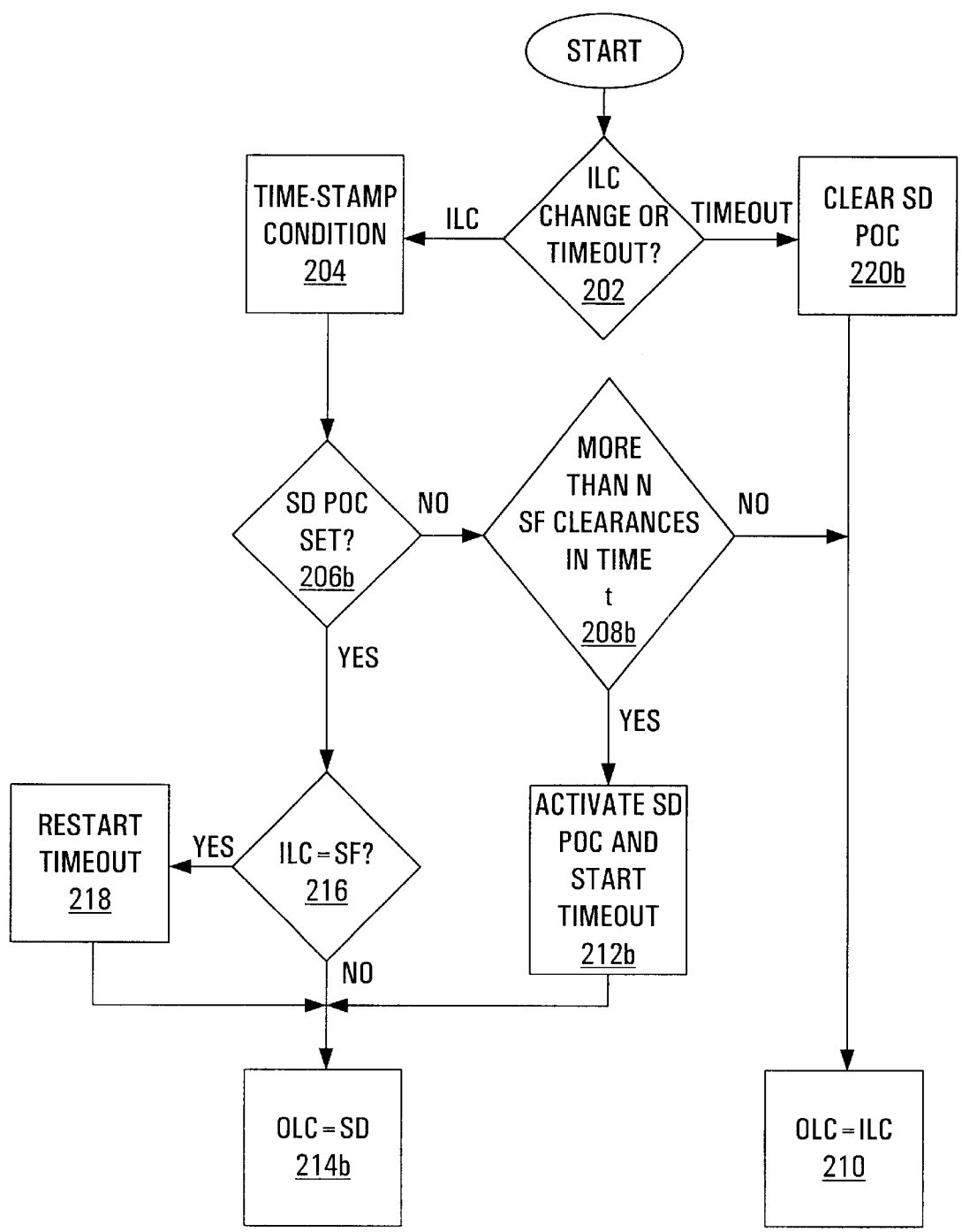

FIGS. 2a and 2b depict flow charts illustrating the steps performed during the prior art LCC algorithm and the steps performed during the preferred embodiment LCC algorithm. Both flow charts are now described together for one of the cables 110,112 with the algorithm for the other cable 110, 112 being identical. Initially within both figures, a change in the ILC and a generation of a Timeout signal, described herein below, are monitored for at step 202. If a change in the ILC is detected at step 202, a time-stamp attribute is attached to the new ILC at step 204. This time-stamp attribute indicates the time that the ILC was detected.

Subsequent to step 204, it is determined, at step 206a within FIG. 2a, whether the SF POC mechanism has already been activated and, at step 206b within FIG. 2b, whether the SD POC mechanism has already been activated. The monitoring of a POC flag determines in both steps 206a and 206b whether the respective POC mechanism is triggered.

If, at step 206a within FIG. 2a, it is found that the SF POC mechanism has not been activated, the LCC algorithm determines, at step 208a, whether an oscillation condition is detected on the ILC. This is done, in the prior art, by determining if the number of different SF conditions within a predetermined amount of time t is greater than a predetermined allowable number n. The time stamping of conditions at step 204 provides the algorithm with the time that each SF condition occurrence starts and ends. Therefore, the algorithm can determine if the number of different SF condition occurrences exceeds the allowable number n within the predetermined time t, indicating an oscillation condition for the ILC corresponding to the particular channel of the prior art algorithm. An example prior art LCC algorithm determines whether more than two SF conditions occur within one minute at step 208a.

If, at step 206b within FIG. 2b, it is found that the SD POC mechanism has not been activated, the LCC algorithm of the preferred embodiment determines, at step 208b, whether an oscillation condition is detected on the ILC. This is done, within the preferred embodiment, by determining if the number of SF condition clearances that have occurred within a predetermined amount of time t is greater than a predetermined allowable number n. An SF clearance occurs when a particular channel has an SF condition that is subsequently reduced to an SD condition or an NR condition. The time stamping of conditions at step 204 provides the algorithm with the time of each SF, SD, and NR condition occurrence. Therefore, by counting the occurrences of an SF condition being reduced to an SD or NR condition, the algorithm can determine if the number of SF clearances exceeds the allowable number n within the time t, indicating an oscillation condition for the ILC corresponding to the particular channel of the preferred embodiment algorithm. In one sample implementation of the preferred embodiment LCC algorithm, the allowable number n is equal to two and the predetermined time t is one minute at step 208b, though it is recognized that other selections could be made depending on the designers requirements.

If, at step 208a and 208b within FIGS. 2a and 2b, an oscillation condition is not detected on the ILC, the OLC is set equal to the ILC at step 210 within both figures. Thus, this means that the POC mechanism is not initiated and the LCC algorithm does not modify the condition that is input to the decision algorithm from the ILC for the particular channel.

If, on the other hand, the criterion of step 208a, i.e. more than the allowable number n of SF conditions occur within the time t, is found, the LCC algorithm of FIG. 2a activates, as depicted at step 212a, the SF POC mechanism so that the OLC is set to an SF condition for at least the predetermined hold time $t_h$ and a timeout function is started. The timeout function counts the time that passes since the last SF condition and generates the Timeout signal, mentioned herein above, if the total time counted exceeds the predetermined hold time $t_h$, in one implementation being equal to one minute.

In similar fashion, if the criterion of step 208b, i.e. more than the allowable number n of SF condition clearances occur within the time t, is found, the LCC algorithm of FIG. 2b activates the SD POC mechanism so that the OLC is set to an SD condition for at least the predetermined hold time $t_h$ and a timeout function is started that is identical to that described above for step 212a.

The end result of steps 212a and 212b is to set, at respective steps 214a and 214b, the OLC to an SF condition and an SD condition respectively.

If, at step 206a of FIG. 2a, the SF POC mechanism has already been activated or if, at step 206b of FIG. 2b, the SD-POC mechanism has already been activated, the algorithm of both figures determines if the ILC is an SF condition at step 216. If the ILC is found to be an SF condition then the timeout function is reset to zero at step 218 within both FIGS. 2a and 2b. This is done to prolong the oscillation controlled OLC which enables the monitoring and detection of any further SF conditions within the newly reset hold time $t_h$. In FIG. 2a, the overall outcome of the ILC not being an SF condition at step 216 and the restarting of the timeout function at step 218 is the OLC being set equal to an SF condition at step 214a. In similar fashion within FIG. 2b, the overall outcome of the ILC not being an SF condition at step 216 and the restarting of the timeout function at step 218 is the OLC being set equal to an SD condition at step 214b.

Referring back to step 202 within both figures, if the Timeout signal is detected within FIG. 2a, the SF POC mechanism is cleared at step 220a. Similarly, if the Timeout signal is detected within FIG. 2b, the SD POC mechanism is cleared at step 220b. In both cases, this indicates that there is no longer an oscillation condition detected on the channel and the OLC is no longer set to a predetermined condition, that being an SF condition for the prior art algorithm of FIG. 2a and that being an SD condition for the preferred embodiment algorithm of FIG. 2b. Instead, within both figures, the result is that the OLC is set equal to the ILC at step 210. The generation of the Timeout signal by the timeout function within FIGS. 2a and 2b means that the ILC has been either in an SD condition or an NR condition for the predetermined hold time $t_h$ or has stayed at an SF condition for the predetermined hold time $t_h$, both cases indicating that there is no longer an oscillation condition on the channel.

Sample operations of the fibre optic system of FIG. 1 with the prior art LCC algorithm depicted within FIG. 2a and with the preferred embodiment LCC algorithm depicted within FIG. 2b are now described with reference to FIGS. 3a and 3b respectively. Both FIGS. 3a and 3b are plots that comprise a vertical axis 302 that represents the various ILCs and OLCs possible with the highest priority failure condition to lowest priority failure condition being from top to bottom (SF to NR), a horizontal axis 304 that represents time, though not to scale, and a legend 306 that depicts the line types that indicate both an ILC and OLC, an OLC only, and an ILC only. For this particular application, the allowable number n is equal to two, the predetermined time t is equal to one minute, and the predetermined hold time $t_h$ is equal to one minute.

As depicted on both FIGS. 3a and 3b, the particular channel is in an NR condition until a time t1 when the ILC becomes an SF condition. In FIGS. 2a and 2b, this occurrence, assuming that the channel was in an NR condition for a long period of time prior to the time t1, would cause the LCC algorithm to go through steps 202, 204, 206, 208, and 210 that would not result in the activation of the POC mechanism but would set the OLC equal to the ILC. In similar fashion, both FIGS. 3a and 3b depict the ILC changing to an NR condition at a time t2, to an SF condition at a time t3, and an NR condition at a time t4. In all three cases within both FIGS. 3a and 3b the OLC remains equal to the ILC since the criteria of step 208a and 208b respectively are not met in any of these occurrences.

At a time t5 within FIG. 3a, the ILC changes to an SF condition which is illustrated as less than a minute since the time t2. Since this indicates there has been three occurrences of an SF condition between just before the time t2 and just after the time t5, the criterion of step 208a is met and the rising edge 308 at the time t5 from the NR condition to the SF condition triggers, at step 212a, the activation of the SF POC mechanism and the start of the timeout function. The activating of the SF POC mechanism within FIG. 3a means that for at least one minute, in this particular example, the OLC will be set to the SF condition.

At a time t5 within FIG. 3b, the ILC also changes to an SF condition, but this change does not trigger the activation of the SD POC mechanism at step 212b since the criterion of step 208b has not been met. There has not been three SF clearances within one minute as required.

At a time t6 within both FIGS. 3a and 3b, the ILC becomes an NR condition. Within FIG. 3a, this reduction in condition level of the ILC does not change the OLC from the set SF condition caused by the activated SF POC mechanism. Within FIG. 3b, it is illustrated that the time t6 is less than one minute after the time t2. Therefore, within FIG. 3b, the falling edge 310 of the ILC from the SF condition to the NR condition at the time t6 is the third SF condition clearance within one minute causing the criterion of step 208b to be met. This results, at step 212b, in the SD POC mechanism being activated and the timeout function being started. The activating of the SD POC mechanism at step 212b means that the OLC is forced to stay at an SD condition for at least one minute in the particular example illustrated.

Within both FIGS. 3a and 3b, the ILC is shown to return to an SF condition at a time t7. This change in ILC causes the LCC algorithm of FIGS. 2a and 2b to proceed through steps 202, 204, 206, 216, 218, and 214 with step 218 resetting the timeout function back to zero. The OLC within FIGS. 3a and 3b remain at the SF and SD conditions respectively as depicted at steps 214a and 214b respectively.

As illustrated within both FIGS. 3a and 3b, the ILC returns to an NR condition at a time t8. This causes the algorithm of FIGS. 2a and 2b to proceed through steps 202, 204, 206, 216, and 214 with the OLC staying at the respective failure conditions set by the POC mechanisms despite the reduction in priority of the ILC.

At a time t9, one minute after the time t7, the Timeout signal is generated by the timeout function within the LCC algorithm of FIGS. 2a and 2b. At this time, the LCC algorithm proceeds through steps 202, 220, and 210 which clears the POC mechanism and sets the OLC to be equal to the ILC as illustrated within both FIGS. 3a and 3b. Therefore, the OLC, in this case, would be an NR condition. If the ILC did not change to an NR condition at the time t8, but stayed at an SF condition until at least the time t9, the Timeout signal would still have been generated and the OLC would still be equal to the ILC. In this case, the OLC would be an SF condition like the ILC.

There are many advantages to the LCC algorithm of the preferred embodiment of the present invention over the prior art LCC algorithm. In cases that the working channel is always selected by the decision algorithm over the protection channel when both channels have SF conditions, a key advantage is illustrated in a particular example in which the protection channel is in an oscillation condition that triggers the activation of the POC mechanism and the working channel has a solid SF condition. The intermitting failure of the protection channel would be preferable to the solid SF condition of the working channel, but the prior art LCC algorithm would maintain an SF condition on the OLC of the protection channel and it would appear in the decision algorithm that both channels had solid SF conditions. Hence, the working channel with the real solid SF condition would be used for transmission of information signals using the prior art LCC algorithm. On the other hand, the LCC algorithm of the preferred embodiment of the present invention would maintain an SD condition on the protection channel, due to the oscillating SF conditions, which would be lower priority than the SF condition on the working channel. Therefore, the preferable protection channel would be utilized for transmitting the information signals.

In cases that the last channel to declare an SF condition is utilized for transmission by the decision algorithm, a similar key advantage occurs when one channel is locked in a condition due to the POC mechanism being activated and the other channel subsequently has a solid SF condition. With use of the prior art LCC algorithm, the channel that has the POC mechanism activated has its OLC locked into an SF condition. Therefore, using the prior art LCC algorithm, the last channel to declare an SF condition, that being the channel with the solid SF condition, would be utilized rather than the preferable channel with the oscillation condition. With use of the preferred embodiment LCC algorithm, the channel with the oscillation condition would have its corresponding OLC locked at an SD condition and therefore would be utilized rather than the channel with the solid SF condition.

There are a number of reasons for the differences in criterion between step 208a of the prior art LCC algorithm and step 208b of the preferred embodiment LCC algorithm. Within the prior art algorithm, the SF POC mechanism is activated when the ILC has a transition from an NR condition or an SD condition to an SF condition. This is done for simplicity since there is no significance recognized in the prior art algorithm to which transition is used.

Within the preferred embodiment algorithm, a transition from an SF condition to an SD condition or NR condition for the ILC triggers the activation of the SD POC mechanism. This is done for a number of reasons. For one, when operating in a bidirectional protection scheme, there must be enough time, hereinafter referred to as clean time, after the OLC is set to an SD condition for the switching card to transmit this SD request to a second switching card at the opposite side of the fibre optic cable and for the second switching card to transmit an acknowledgement. If the SD POC mechanism was set when the ILC had a transition from an NR condition or SD condition to an SF condition and the other channel had a solid SF condition, the switching card would attempt to transmit the SD request on the oscillating channel during a period in which it has an SF condition rather than during a period in which it has an NR condition or an SD condition.

Another reason for the difference in transitions for setting of the POC mechanism within the preferred embodiment LCC algorithm compared to the prior art is a desire to have a channel with a solid SD condition to be utilized over a channel with an oscillating SF condition. In one well known decision algorithm, where both channels have an SD condition, the channel that was utilized last prior to the channels having equal conditions remains in use for the transmission of the information signals. If one channel is in a solid SD condition and the other is in an oscillating SF condition, the decision algorithm will rotate the channel of transmission between the two channels as the one channel fluctuates between having an SF condition and having an NR condition. Once the preferred embodiment LCC algorithm of the oscillating channel triggers the activation of the SD POC mechanism, both channels will have SD conditions. The channel with a solid SD condition though will be utilized since directly prior to the channels having equal priority conditions, the channel with the oscillating SF condition had an SF condition and the channel with the solid SD condition was utilized.

Due to the difference with regard to the transitions of the ILC that trigger the activation of the POC mechanism between the prior art LCC algorithm and the preferred embodiment LCC algorithm, the predetermined time t within the algorithm is not consistent. This can be compensated for within the preferred embodiment by making the predetermined time t larger.

There are numerous modifications that can be done to the preferred embodiment of the present invention. One such alternative embodiment removes the resetting of the timeout function when the ILC has a new SF condition. Therefore, within this embodiment, the SD POC mechanism is cleared after the predetermined hold time $t_h$ no matter if the ILC is still within an oscillation condition or not.

Another alternative embodiment is contemplated when the decision algorithm always chooses the working channel over the protection channel in cases of equal priority conditions. In such a situation, this alternative embodiment of the present invention only has the preferred embodiment LCC algorithm for the protection channel with the prior art LCC algorithm being used for the working channel.

Although the preferred embodiment has the LCC algorithm implemented in software within a Digital Signal Processor (DSP), yet another alternative embodiment is the case where the LCC algorithm is actually implemented with use of discrete hardware components. In such a case, a Field Programmable Gate Array (FPGA) or operational amplifiers may be utilized to implement the present invention.

One skilled in the art would be able to further modify the present invention for cases in which more than two channel cables are utilized, with an LCC algorithm according to the preferred embodiment of the present invention implemented within the switching card for each channel. As well, an embodiment within a Bi-directional Line Switch Ring (BLSR) can be contemplated in which each individual fibre optic cable of the BLSR is controlled as in the preferred embodiment of the present invention. Yet another such alternative embodiment would be with a 1:N communication system in which there is one protection channel for N working channels. In such an embodiment some or all of the channels of the system can be controlled as in the preferred embodiment of the present invention.

Although the present invention utilizes an SDH, and more specifically a SONET standard, it should be understood that other standards that have limited numbers of failure condition priorities may require an algorithm implementation similar to the preferred embodiment of the present invention to prioritize oscillating conditions relative to solid signal conditions.

Persons skilled in the art will appreciate that there are yet more alternative implementations and modifications possible to use an apparatus similar to that described above to distinguish between solid signal and oscillation failures, and that the above implementation is only an illustration of this embodiment of the invention. The scope of the invention, therefore, is only to be limited by the claims appended hereto.

What is claimed is:

1. A control apparatus capable of being implemented within a switching card coupled to at least two signal transmission means, the control apparatus being input with an input line condition (ILC) with respect to one of the two signal transmission means and outputting a corresponding output line condition (OLC) with use of line condition control (LCC) logic operating within the control apparatus; and wherein the LCC logic is capable of activating a protection oscillation control (POC) mechanism for a hold time if the ILC is detected to be oscillating between a maximum failure priority condition and a non-maximum failure priority condition, setting the OLC equal to a first failure priority condition that is less than the maximum failure priority condition if the POC mechanism is activated, and setting the OLC equal to the corresponding ILC if the POC mechanism is not activated.

2. A control apparatus according to claim 1, wherein the LCC logic, when input with a change of the ILC, determines if the POC mechanism is activated; if the POC mechanism is activated, sets the OLC corresponding to the ILC to the first failure priority condition; if the POC mechanism is not activated, determines whether the ILC is oscillating between the maximum failure priority condition and the non-maximum failure priority condition; if the ILC is oscillating, activates the POC mechanism and sets the OLC to the first failure priority condition; and, if the ILC is oscillating, sets the OLC to the ILC.

3. A control apparatus according to claim 2, wherein the LCC logic further, when activating the POC mechanism, starts a timeout function that generates a timeout signal if a hold timing criterion is met; and, if a timeout signal is generated, clears the POC mechanism and sets the OLC to the ILC.

4. A control apparatus according to claim 3, wherein the timeout criterion is met if the timeout function counts to a predetermined hold time.

5. A control apparatus according to claim 4, wherein the predetermined hold time is 1 minute.

6. A control apparatus according to claim 4, wherein the LCC logic further, if the POC mechanism is activated, determines if the ILC is the maximum failure priority condition; and, if the ILC is the maximum failure priority condition, restarts the timeout function.

7. A control apparatus according to claim 1, wherein the LCC logic attaches a time indication to each change in the ILC; and wherein the ILC is detected to be oscillating between a maximum failure priority condition and a non-maximum failure priority condition if more than a predetermined number of maximum failure priority condition clearances occur within a predetermined time.

8. A control apparatus according to claim 7, wherein the predetermined number is equal to 2 and the predetermined time is equal to 1 minute.

9. A control apparatus according to claim 1, wherein the LCC logic attaches a time indication to each change in the ILC; and wherein the ILC is detected to be oscillating between a maximum failure priority condition and a non-maximum failure priority condition if more than a predetermined number of maximum failure priority condition activations occur within a predetermined time.

10. A control apparatus according to claim 1, wherein the first failure priority condition is a signal degrade condition and the maximum failure priority condition is a signal failure condition.

11. A control apparatus according to claim 1, wherein the LCC logic is implemented with use of software and the control apparatus is a digital signal processor.

12. A control apparatus according to claim 1, wherein the LCC logic is implemented using discrete hardware components.

13. A switching card incorporating at least one of the control apparatuses of claim 1, the switching card, capable of being coupled to at least two signal transmission means, further Comprising a decision apparatus that takes as input at least one OLC, corresponding to at least one of the transmission means, output from the control apparatus; and wherein the decision apparatus selects which one of the two signal transmission means to be used for transmitting information signals with use of decision logic operating within the decision apparatus.

14. A switching card according to claim 13 capable of being coupled to a working signal transmission means and a protection signal transmission means; and wherein the decision logic selects, if one of the working and protection signal transmission means has a lower failure priority condition than the other of the working and protection signal transmission means, the one of the working and protection signal transmission means with the lower failure priority condition; and selects, if the working and protection signal transmission means both have the same failure priority condition, the working signal transmission means.

15. A switching card according to claim 14 further comprising a second control apparatus input with a second ILC with respect to the working signal transmission means and outputting a corresponding second OLC with use of a second LCC logic operating within the second control apparatus; and wherein the second LCC logic is capable of activating a second POC mechanism for the hold time if the second ILC is detected to be oscillating between the maximum failure priority condition and the non-maximum failure priority condition, setting the second OLC equal to the maximum failure priority condition if the second POC mechanism is activated, and setting the second OLC equal to the corresponding second ILC if the second POC mechanism is not activated; and wherein the control apparatus corresponds to the protection channel and the decision apparatus takes as input the OLC from the control apparatus and the second OLC from the second control apparatus.

16. A communication system incorporating first and second switching cards according to claim 13, the communication system further comprising first and second port cards coupled to first and second switching cards respectively, a protection channel signal transmission means coupled between the first and second switching cards, and a plurality of working signal transmission means coupled independently between the first and second switching cards.

17. A switching card incorporating first and second control apparatuses according to the control apparatus of claim 1, the switching card, capable of being coupled to working and protection signal transmission means, further comprising a decision apparatus that takes as input first and second OLCs output from the first and second control apparatuses respectively, the first and second control apparatuses taking as input first and second ILCs corresponding to the working and protection signal transmission means respectively; and wherein the decision apparatus selects which of the working and protection signal transmission means to be used for transmitting information signals with use of decision logic operating within the decision apparatus.

18. A switching card according to claim 17, wherein the decision logic selects, if one of the working and protection signal transmission means has a lower failure priority condition than the other of the working and protection signal transmission means, the one of the working and protection signal transmission means with the lower failure priority condition; selects, if the working and protection signal transmission means both have the first failure priority condition, whichever one of the working and protection signal transmission means that had the first failure priority condition occur last; and selects, if the working and protection signal transmission means both have the maximum failure priority condition or both have a no failure priority condition, the working signal transmission means.

19. A switching card according to claim 17, wherein the decision logic selects, if one of the working and protection signal transmission means has a lower failure priority condition compared to the other of the working and protection signal transmission means, the one of the working and protection signal transmission means with the lower failure priority condition; and selects, if both the working and protection signal transmission means have the same failure priority condition, whichever one of the working and protection signal transmission means that had a particular failure priority condition occur last.

20. A communication system incorporating first and second switching cards according to claim 17, the communication system further comprising first and second port cards coupled to the first and second switching cards respectively, and working and protection signal transmission means coupled independently between the first and second switching cards.

21. A communication system according to claim 20, wherein the working and protection signal transmission means are fibre optic cables.

22. A communication system according to claim 20, wherein the working and protection signal transmission means are electrical wires.

23. A communication system according to claim 20, wherein the working and protection signal transmission means are radio waves.

24. A communication system according to claim 20 that adheres to the SONET standard.

25. A communication system according to claim 20 that is a Synchronous Digital Hierarchy (SDH) system.

26. A bi-directional line switch ring (BLSR) system incorporating a plurality of communication systems according to claim 20, in which the communication systems are connected in series with a first communication system coupled directly to a last communication system.

27. In a control apparatus capable of being implemented within a switching card coupled to at least two signal transmission means, a method of controlling an output line condition (OLC) corresponding to one of the transmission means with use of a corresponding input line condition (ILC), the method comprising the steps of:

activating a protection oscillation control (POC) mechanism for a hold time if the ILC is detected to be oscillating between a maximum failure priority condition and a non-maximum failure priority condition;

setting the OLC to a first failure priority condition that is less than the maximum failure priority condition if the POC mechanism is activated; and setting the OLC equal to the corresponding ILC if the POC mechanism is not activated.

* * * * *